Oct. 10, 1944.   H. BROWN ET AL   2,359,894
WELL LOGGING METHOD AND APPARATUS
Filed Feb. 10, 1941   2 Sheets-Sheet 1
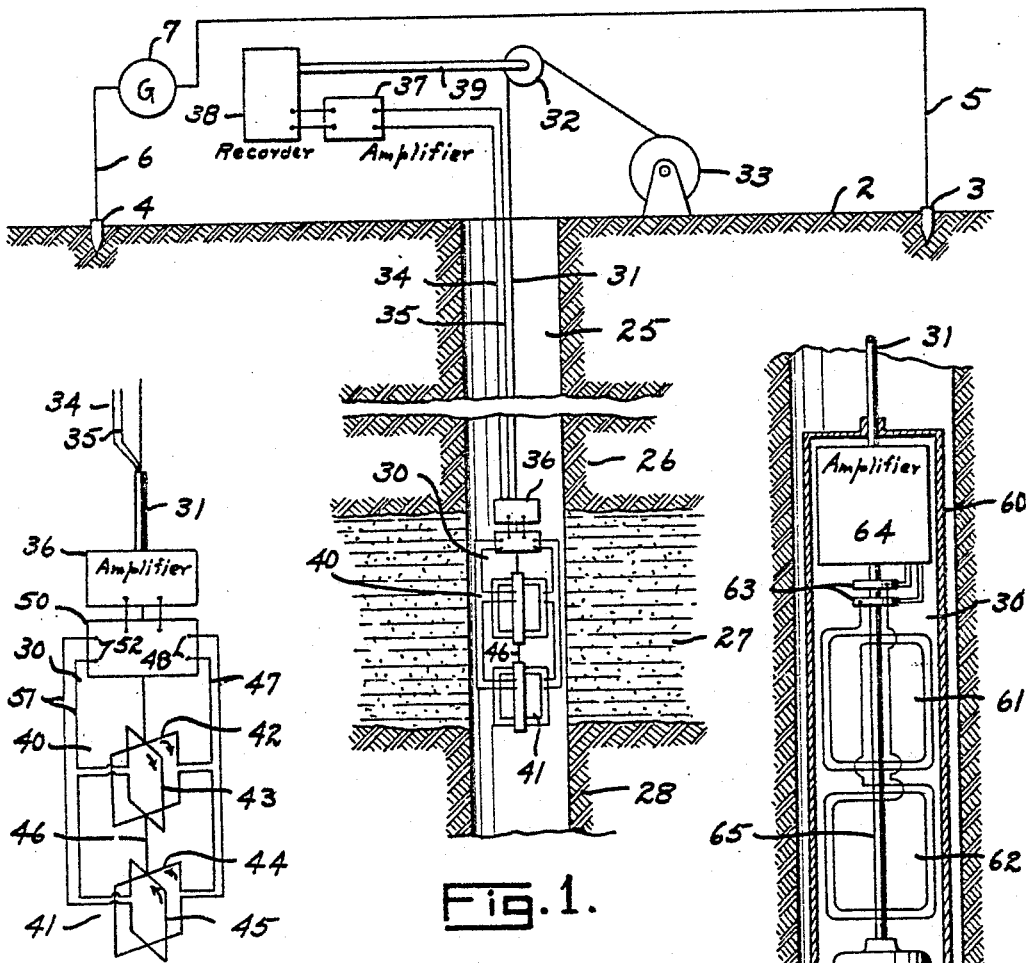
Fig.1.
Fig.2.
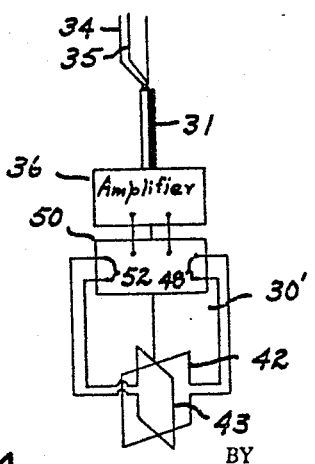
Fig.3.
Fig.4.
HART BROWN
H. S. RIBNER
INVENTORS.
BY Lester B. Clark.
ATTORNEY.

Oct. 10, 1944.  H. BROWN ET AL  2,359,894
WELL LOGGING METHOD AND APPARATUS
Filed Feb. 10, 1941  2 Sheets—Sheet 2

HART BROWN
H. S. RIBNER
INVENTORS.

BY Lester B. Clark
ATTORNEY.

182 Patented Oct. 10, 1944

2,359,894

UNITED STATES PATENT OFFICE 2,359,894

WELL LOGGING METHOD AND APPARATUS

Hart Brown and Herbert S. Ribner, Houston, Tex.; said Ribner assignor to said Brown Application February 10, 1941, Serial No. 378,136

1 Claim. (Cl. 175—182)

This invention relates to the electrical logging of well bores and is particularly adapted to the logging of cased wells although it possesses certain advantages over previously suggested methods for logging uncased wells.

The invention is based upon the fact that, when a local area of current conduction is established in the earth and such current flows in a direction substantially normal to the axis of a well within the area of conduction such flow of current produces in the well a magnetic field which may be measured at various levels in the well as an indication of the variations in the geological strata penetrated by the well. The effect of the presence of casing upon such measurements will be a shielding of the measuring device whereby the intensity of the magnetic field on the interior of the casing will be greatly reduced. Since, however, the current flow lines intersect the well substantially normally to its axis, the casing will not otherwise materially distort the magnetic field reaching the measuring device and the effect of the casing therefore will be only the production of an attenuating factor which does not vary with the depth of the well.

It has become common practice to electrically log a well before casing is set therein whereby there is provided a chart of electrical characteristics of the earth plotted against the depth to indicate the nature and extent of the respective formations penetrated by the bore. Knowledge of the resistivity of geological formations is of particular value since this information enables the determination of the location of oil bearing formations, the approximate thickness of such formations, and to some extent the concentration of the oil or gas contained therein.

Many wells were drilled before the adoption of electrical logging methods and hence there is no electrical logging information available on such wells. As the producing sand in these wells becomes depleted the wells become commercially unprofitable. By making an electrical log available it is possible in many cases to tap other penetrated sands and hence to continue production from such other sand or sands.

The present invention enables electrical logging of cased wells and hence makes it possible to obtain geological information of cased wells which were not previously logged. It is to be understood however, that, as already pointed out, the invention may be advantageously used in the logging of uncased wells. It is also to be noted that, as will be more fully explained, the technique of the invention measures essentially the horizontal resistivity of the penetrated beds whereas the prior art methods measured primarily the vertical resistivity of the formations.

The primary object of the invention is to provide novel means and method for obtaining an electrical log of bore holes whether such holes be either cased or uncased.

Another object is to provide an electrical log of a well by creating an area of current conduction in and about the well and measuring the variations in the magnetic field strength in the well as an indication of the nature of the penetrated formations.

Still another object is to determine gradient or rate of change of the magnetic field with respect to depth in a well in a conducting area, such derivative or gradient being correlatable with the resistivity of the formations penetrated by the well.

Still another object is to determine the horizontal resistivity of the strata penetrated by the well bore.

The foregoing objects will, together with other objects, be more fully apparent from the following description of the invention taken in connection with the accompanying drawings in which:

Fig. 1 is a schematic illustration of apparatus that may be used in carrying out the invention, such apparatus being shown in relative position with the earth and the bore hole being logged;

Fig. 2 is an enlarged graphical illustration of the preferred form of exploring unit whereby the magnetic gradient or derivative within a well is obtained;

Fig. 3 illustrates a modified form of exploring unit for obtaining indications of the magnetic gradient within a well;

Fig. 4 illustrates a modification of the unit shown in Fig. 2 whereby indications are obtained of the variations in the magnetic flux between different levels in a well;

Figure 5:
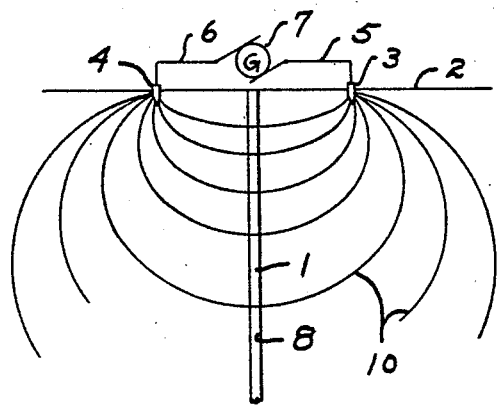
Figs. 5 and 6 are respectively a schematic elevation and a plan view illustrating the manner of creating a current conducting area in the earth and the resulting distribution of such current.
Figure 6:
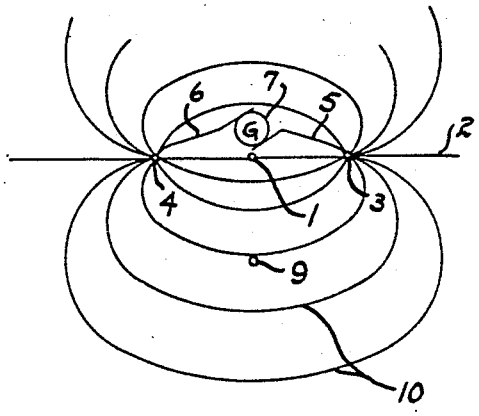

Referring first to Figs. 5 and 6 the numeral 1 represents a bore hole extending downwardly from the surface 2 of the earth. Electrodes 3 and 4 are embedded in the earth and are connected by means of conductors 5 and 6 to a generator 7 of electrical energy, which generator may be a source of either direct current or alternating current. By means of the construction thus generally described an area of current conduction in the earth is established and the paths of current flow are three dimensional curves. These curves are shown at 10 in elevation in Fig. 5.

It is to be noted that so long as the earth within the area of current conduction is essentially homogeneous or consists of geological formations which are substantially parallel to the surface 2, the paths 10 across the bore hole 1 are substantially normal to the axis of the bore hole. For this reason the conductivity of the casing 8, if the bore hole 1 be cased, will distort or modify the distribution of current very little if at all and in any event such effect will be very local.

Fig. 6 represents a plan view of the arrangement shown in Fig. 5. The lines 10 of current conduction are here shown in horizontal plane and it is to be noted that such paths cross the axis of the bore hole 1, or other bore holes such as 9 in the area of current conduction, substantially normally if the earth is homogeneous or is horizontally stratified.

Figure 7:
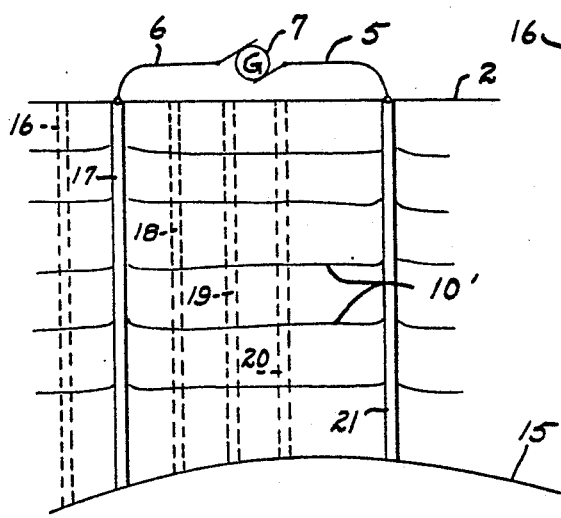
Figs. 7 and 8 are similar to Figs. 5 and 6 but illustrate the use of a casing in cased bore holes for introducing an electric current into the earth.

Fig. 7 illustrates a section through a developed field in which the numeral 15 represents an oil bearing formation which is reached by the wells 16 to 21 inclusive. An alternative arrangement of the electric circuit is here shown as comprising the generator 7 which is connected by means of conductors 5 and 6 to the casings in the bore holes 17 and 21 so that the entire casing of each of these wells serves as an electrode. With this arrangement the lines of current flow through substantially homogeneous or horizontally stratified earth formations lie in substantially horizontal planes as shown at 10'. The concentration of these lines will be greatest at the top of the well and will decrease with depth depending upon the electrical conditions of the well casing.

Figure 8:
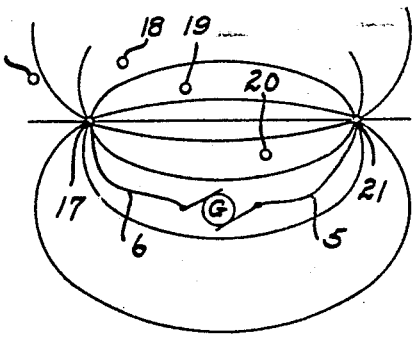

With the conductors 5 and 6 connected to the casings in the wells 17 and 21 as shown in Figs. 7 and 8 the current flows in curvilinear paths which are substantially horizontal and which substantially normally intersect the axes of the wells 18, 19 and 20 lying generally between the wells 17 and 21. Likewise if well 16 is not too far distant from the well 17, the path of current flow will cross the axis of this well substantially in horizontal planes except in the extreme lower portion of such well.

The foregoing observations obtain whether the generator 7 supplies direct current or alternating current of sufficiently low frequency that the reactance of the earth is not appreciable. The present invention contemplates the use of either form of current, the measuring apparatus used in either case being of a form that the desired measurement of the magnetic field strength is obtained.

Referring now to Fig. 1 there is shown the bore hole 25 which is being logged, such bore hole extending from the surface 2 to and through one or more formations shown as 26, 27 and 28. The bore hole may or may not contain a liquid such as water or drilling mud but the presence of such a liquid is not essential when utilizing the logging equipment of the specific form to which reference will now be made.

The exploring or measuring unit 30 is shown as suspended from a conductor cable 31 which passes over a pulley 32 and thence to a winch 33 so that the unit 30 may be desirably raised and lowered within the well bore. In the figure the conductors 34 and 35 are shown exteriorly of the cable for sake of clarity and such conductors extend from the amplifier 36 within the well to a second amplifier 37 at the mouth of the well. The output from the amplifier 37 is conducted to the recorder 38 which is of any suitable construction. Such recorder is also connected by means of shaft 39 to the pulley 32 so that the tape upon which a graphical record is produced by the recorder 38 is moved in accordance with the movement of the unit 30 within the bore hole.

The unit 30 comprises two pairs of coils 40 and 41 which respectively comprise induction coils 42, 43 and 44, 45. In Fig. 2 these coils are shown diagrammatically as mechanically interconnected by means of a supporting cable 46 and both pairs of coils are in turn suspended from the cable 31 thereabove. Each of the coils is also shown as a single turn by way of illustration, it being understood that any suitable number of turns will be utilized to obtain the desired sensitivity of the measuring unit to the magnetic flux being measured.

It is to noted that the coils 42 and 44 are connected in series opposition so that the differential potential induced in these coils represents the gradient of the component of magnetic flux between these coils and normal to the plane thereof. This differential potential is conducted through the conductors 47 to the terminals 48 of a phase shifter and mixer 50. In a similar manner the coils 43 and 45 are electrically interconnected in series opposition and the differential potential induced therein is conducted through the conductors 51 to the terminals 52 of the phase shifter and mixer.

The unit 50 comprises merely phase shifting means for providing the desired phase relation between the potentials supplied at the terminals 48 and 52. These potentials are then added, as by a series connection, so that the resulting composite potential is directly proportional to the magnetic flux regardless of the orientation of the coils about a vertical line.

It seems apparent from the foregoing description that the graphical record produced by the recorder 38 in accordance with the foregoing description represents the gradient or derivative of magnetic flux in the well with depth. As already explained such record is little affected by presence of the casing in the bore hole 25 since the casing merely produces a shielding action which may be overcome by altering the ratio of amplification of either or both of the amplifiers 36 and 37.

In Fig. 4 there is shown a modified form of exploring or measuring unit 30' which is identical to that shown in Fig. 2 except that the lower pair 41 of induction coils is omitted and the respective coils 42 and 43 are connected directly to the terminals 48 and 52 of the unit 50. This modified form of the measuring unit, similar to that already described, is not affected by changes in orientation in the well bore. The measurements are somewhat different, however, as the unit is instrumental at all times in indicating the average value of the magnetic flux at the location of the unit in the well instead of indicating gradient of the flux at that level.

The forms of exploring unit just described are suitable for use when an alternating or pulsating source 7 of current is utilized for producing the area of current conduction in the earth.

In Fig. 3 there is shown a measuring unit 30'' comprising a housing 60 which is supported by the cable 31 and which houses upper and lower coils 61 and 62 connected in series opposition. These coils are connected to slip rings 63 whence the differential potential is conducted to the input of the amplifier 64 which serves the same purpose as the amplifier 36 in the embodiments already described. The coils 61 and 62 are mounted upon a shaft 65 which is rotated by means of motor 66 in the lower end of the housing 60. This motor is shown as self-contained such as a spring operated motor but it is apparent that it may be operated from a source of energy within the housing 60 or by means of a source of energy at the mouth of the well bore, such energy being transmitted to the motor by means of additional conductors in the cable 31.

This construction contemplates that the rotating coils 61 and 62 shall cut the lines of force of the magnetic flux in the well bore and there will therefore be a potential induced in each of the coils. Since the coils are connected in opposition the resulting potential conducted by the slip rings 63 to the amplifier 64 represents at any instant a gradient or rate of change of the magnetic flux at the location of the measuring unit. This embodiment is of utility when either alternating current or direct current is introduced into the earth and also eliminates any effect of changes of orientation of the unit in the well bore.

As already explained the records obtained in accordance with the described apparatus and technique are correlatable with the resistivity of the formations through which the measuring unit passes. When the lines of current conduction intersect the well substantially normally to the axis of the well the record therefore indicates horizontal resistivity.

Broadly the invention comprehends a novel method and apparatus for obtaining an electric log of a bore hole whether such bore hole be cased or uncased, such log representing primarily the horizontal resistance of the formations penetrated by the bore hole.

What is claimed is:

An apparatus for lowering into a well bore for well logging including two pairs of vertically spaced inductors, the inductors of each pair being angularly spaced in two planes about a vertical line in the well, the coils in each vertical plane being connected in series opposition whereby two differential potentials are induced in the coil groups, means for combining said potentials, and means for recording the resultant potential.

HART BROWN.
HERBERT S. RIBNER.